United States Patent
Choi (10) Patent No.: US 8,238,216 B2
(45) Date of Patent: Aug. 7, 2012

(54) HOLOGRAPHIC RECORDING/REPRODUCING APPARATUS HAVING APERTURE OF VARIABLE SIZE

(75) Inventor: Jong-chul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 999 days.

(21) Appl. No.: 11/960,992

(22) Filed: Dec. 20, 2007

(65) Prior Publication Data

US 2008/0316894 A1 Dec. 25, 2008

(30) Foreign Application Priority Data

Jun. 21, 2007 (KR) .................. 10-2007-0061122

(51) Int. Cl.
*G11B 7/00* (2006.01)
(52) U.S. Cl. ........................................ 369/103; 369/118
(58) Field of Classification Search .................. 369/103
See application file for complete search history.

(56) References Cited

U.S. PATENT DOCUMENTS

| | | | |
|---|---|---|---|
| 5,281,797 A | 1/1994 | Tatsuno et al. | |
| 5,694,488 A | 12/1997 | Hartmann | |
| 5,892,597 A | 4/1999 | Iwata et al. | |
| 6,088,321 A * | 7/2000 | Yamaji et al. | 369/103 |
| 7,092,133 B2 | 8/2006 | Anderson et al. | |
| 2004/0180266 A1* | 9/2004 | Hirao et al. | 430/1 |
| 2005/0036436 A1* | 2/2005 | Horimai et al. | 369/118 |
| 2005/0046865 A1* | 3/2005 | Brock et al. | 356/495 |
| 2006/0083145 A1* | 4/2006 | Yoo et al. | 369/112.01 |
| 2007/0030787 A1* | 2/2007 | Kim | 369/103 |
| 2007/0121468 A1* | 5/2007 | Koyama et al. | 369/103 |
| 2008/0225670 A1* | 9/2008 | Shimada et al. | 369/103 |
| 2009/0040903 A1* | 2/2009 | Tokuyama | 369/103 |
| 2010/0232278 A1* | 9/2010 | Ogasawara | 369/100 |

FOREIGN PATENT DOCUMENTS

KR 100165599 B1 9/1998

OTHER PUBLICATIONS

International Search Report issued in PCT International Application No. PCT/KR2008/000229 on Apr. 15, 2008.

* cited by examiner

*Primary Examiner* — Wayne Young
*Assistant Examiner* — Dionne Pendleton
(74) *Attorney, Agent, or Firm* — NSIP Law

(57) ABSTRACT

Provided is a holographic recording/reproducing apparatus including an aperture device having aperture of variable size. The holographic recording/reproducing apparatus includes a light source, an optical system to divide light emitted from the light source into a recording reference beam and a recording signal beam, and direct the recording reference beam and the recording signal beam to a same location of a holographic recording medium, a spatial light modulator (SLM) to modulate the recording signal beam into a two-dimensional signal pattern, a two-dimensional photodetector to detect a reproducing signal beam that is refracted via the holographic recording medium, and the aperture to limit a size of a spot of the reproducing signal beam, wherein the size of the aperture is variable.

24 Claims, 5 Drawing Sheets

HOLOGRAPHIC RECORDING/REPRODUCING APPARATUS HAVING APERTURE OF VARIABLE SIZE

CROSS-REFERENCE TO RELATED APPLICATION

This application claims all benefits accruing under 35 U.S.C. §119 from Korean Patent Application No. 2007-61122, filed on Jun. 21, 2007 in the Korean Intellectual Property Office, the disclosure of which is incorporated herein by reference.

BACKGROUND OF THE INVENTION

1. Field of the Invention

The present invention relates to a holographic recording/reproducing apparatus, and more particularly, to a holographic recording/reproducing apparatus having an aperture of variable size.

2. Description of the Related Art

Hologram technology is being used to record/reproduce an optical signal in/from a stereoscopic image by recording an interference pattern between a recording signal beam, which carries a signal, and a recording reference beam, which makes a predetermined angle with the recording signal beam. Optical storage technology for recording and reproducing digital data using holographic principles has recently been highlighted, and will be referred to hereinafter as holographic information recording and reproducing technology. The holographic information recording and reproducing technology allows recording and reproducing of data or information in units of pages, by which a plurality of digital data are simultaneously recorded/reproduced in a shape of a two-dimensional image. Thus, an ultra-high speed recording/reproducing system can be implemented thereby. In addition, the holographic information recording and reproducing technology can even separate and read information which is spatially overlapped and stored in a holographic recording medium by using a proper multiplexing technique. Thus, data or information of several pages can be recorded in an overlapping manner and be reproduced from the same region of the holographic recording medium.

Figure 1A:
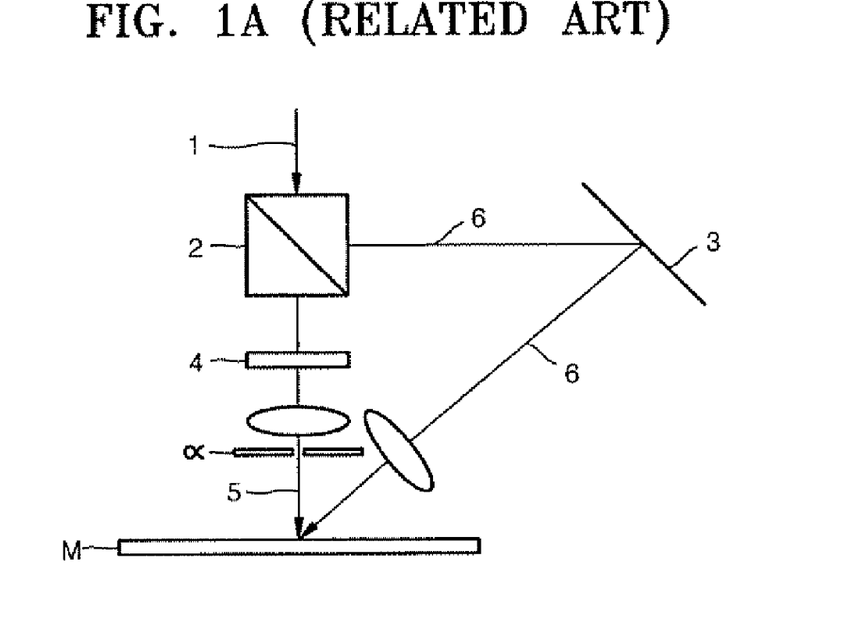
FIGS. 1A and 1B are views illustrating a principle of operation of a typical holographic information recording/reproducing apparatus using holographic technology to record and reproduce information.

FIG. 1A schematically illustrates a principle of recording information using holographic information recording and reproducing technology in a typical holographic information recording/reproducing apparatus. As illustrated in FIG. 1A, a beam splitter 2 splits a laser beam 1 into a reference beam (or a recording reference beam) 6 and a signal beam (or a recording signal beam) 5. The signal beam 5 passes through a spatial light modulator (SLM) 4, is modulated into a two-dimensional signal pattern, and is then incident on a holographic recording medium M. An aperture (or an aperture device) a may be disposed on the optical path of the signal beam 5 so that only a desired signal beam can be incident on the holographic recording medium M. Meanwhile, the reference beam 6 is reflected by a mirror 3 and is incident on the holographic recording medium M at a predetermined angle, causing the reference beam 6 to interfere with the signal beam 5. An interference pattern formed in this way is recorded in the holographic recording medium M.

Figure 1B:
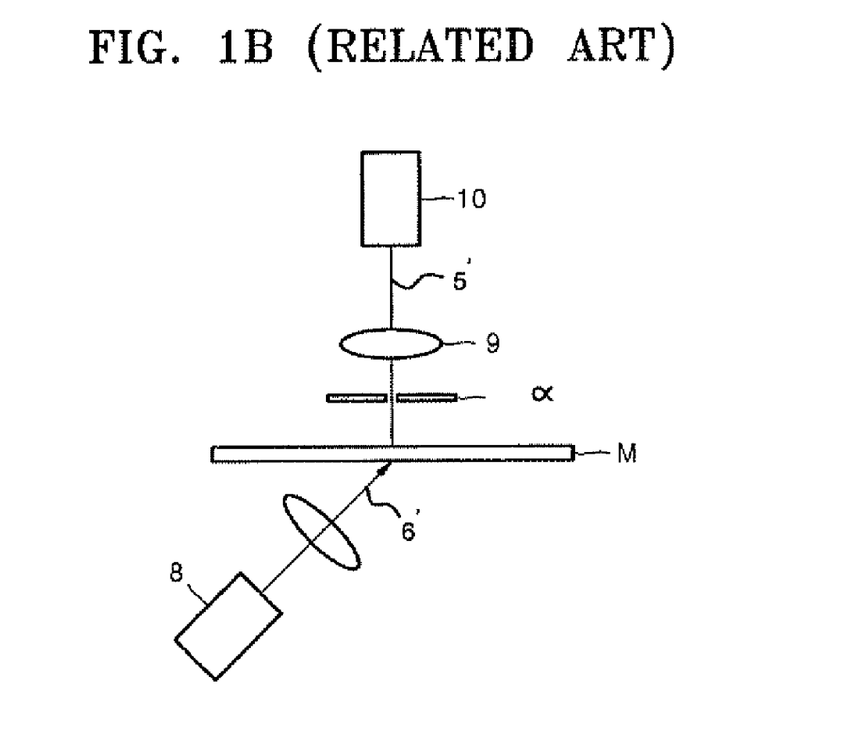

FIG. 1B illustrates a principle of reproducing recorded information using a recorded hologram in the typical holographic information recording/reproducing apparatus. When information is to be reproduced, a light source 8 is used to emit a beam of light 6' to be irradiated on the holographic recording medium M. The light 6' is a reproducing reference beam of the same wavelength as the reference beam 6 that is used when information is recorded. The reference beam 6' should be incident on the holographic recording medium M at the same angle of incidence as when the information is recorded. Then, a signal beam (a reproducing signal beam) 5' having a two-dimensional signal pattern containing original data information is generated from the reference beam 6' by diffraction via the holographic recording medium M. The signal beam 5' is condensed by a lens 9, and is then detected by a two-dimensional photodetector 10, such as a charge coupled device (CCD). The aperture a is disposed on the optical path of the signal beam 5' so that only a desired signal thereof can be detected by the photodetector 10 and other signal beams can be cut off.

The holographic recording/reproducing apparatus records a two-dimensional signal pattern in predetermined units in the holographic recording medium M. Generally, a two-dimensional region, which is a unit of recoding/reproducing information in/from the holographic recording medium M, is referred to as a book. For example, information of various pages can be simultaneously recorded on the holographic recording medium M in a multiplexing manner, such as angular multiplexing, in one book.

Meanwhile, to increase a recording density of the holographic recording medium M, it is important to narrow an interval between books in the holographic recording medium M. Additionally, an optical spot of the two-dimensional signal pattern, which is formed on the holographic recording medium M, should have an optimum size. To increase the recording capacity of the holographic recording medium, InPhase Technologies of Longmont, Colo. has suggested a method in which a polytopic aperture (or a polytopic aperture device) is used. The polytopic aperture has a size 1.1 times that of a Nyquist aperture (or a Nyquist aperture device), which has a minimum aperture size, so that an image frequency component of the spatial light modulator (SLM) may be transmitted without loss. The Nyquist aperture has a size equal to half of a size of the optical spot. The Nyquist aperture transmits all image frequency components, but deteriorates the quality of a signal. Accordingly, an appropriate aperture, a size of which is slightly greater (e.g., 1.1 times) than that of the Nyquist aperture, can be used such that the required signal quality may be obtained. Such an aperture is referred to as a polytopic aperture.

SUMMARY OF THE INVENTION

The present invention provides a holographic recording/reproducing apparatus including a polytopic aperture so that the recording capacity of a holographic recording medium can be increased.

Additional aspects and/or advantages of the invention will be set forth in part in the description which follows and, in part, will be obvious from the description, or may be learned by practice of the invention.

According to an example embodiment of the present invention, a holographic recording/reproducing apparatus includes: a light source; an optical system to divide light emitted from the light source into a recording reference beam and a recording signal beam, and directs the recording reference beam and the recording signal beam to a same location of a holographic recording medium; a spatial light modulator (SLM) to modulate the recording signal beam into a two-dimensional signal pattern; a two-dimensional photodetector to detect a reproducing signal beam refracted via the holographic recording medium; and an aperture device having an aperture to limit a size of a spot of the reproducing signal beam, wherein the size of the aperture is variable.

According to an example embodiment of the present invention, the aperture device may include a liquid crystal. The aperture may include a shutter.

According to an example embodiment of the present invention, the size of the aperture may vary according to a size of a spot of the reproducing signal beam that is Fourier-transformed by the optical system.

According to an example embodiment of the present invention, the optical system may include an objective lens to provide the recording signal beam to the holographic recording medium, and the aperture device may be disposed between the objective lens and the holographic recording medium. The aperture device may be disposed on a location of a focal point of the objective lens. The optical system may include a plurality of relay lenses and an objective lens, which provides the recording signal beam to the holographic recording medium, and the aperture device may be disposed between the relay lenses.

According to an example embodiment of the present invention, a holographic recording/reproducing apparatus includes: a light source to emit a light beam with a predetermined wavelength; an optical device to split the light beam into a recording signal beam and a recording reference beam, and to form an interference pattern on a holographic recording medium by converging the recording signal beam and the recording reference beam at a spot for holographic recording; and an aperture device positioned between the optical device and the holographic recording medium, and comprising an aperture having a size that is variable according to a size of the spot so that the interference pattern is recorded on or reproduced from the holographic recording medium in intervals corresponding to the size of the aperture.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to embodiments of the present invention, examples of which are illustrated in the accompanying drawings, wherein like reference numerals refer to the like elements throughout. The example embodiments are described below in order to explain the present invention by referring to the figures.

As described in connection with FIGS. 1A, 1B, a polytopic aperture is used in order to increase the recording capacity of a holographic recording medium. In this case, an image (i.e. a signal beam) of a spatial light modulator (SLM), which is Fourier-transformed by a lens, is formed as an optical spot of the signal beam. A size of the spot is given by Equation 1.

$$\text{spot size} = \frac{2f\lambda}{d} \qquad (1)$$

where "f" is a focal length of a lens, "λ" is a wavelength of a light source, and "d" is a size of one pixel of the SLM.

Meanwhile, like a typical optical recording medium, a holographic recording medium requires a region (or an area) for recording user information (or user data) and a region (or an area) for recording additional information (or additional data) related to the holographic recording medium. For example, the additional information may be information regarding a method of scheduling for use of the holographic recording medium, information regarding a method of multiplexing, information regarding a physical address, information regarding a degree of multiplexing, information regarding shrinkage, information regarding sensitivity, information regarding an initially set parameter, or the like. Accordingly, recording of the user information and the additional information will be discussed with reference to FIGS. 2 and 3.

Figure 2:
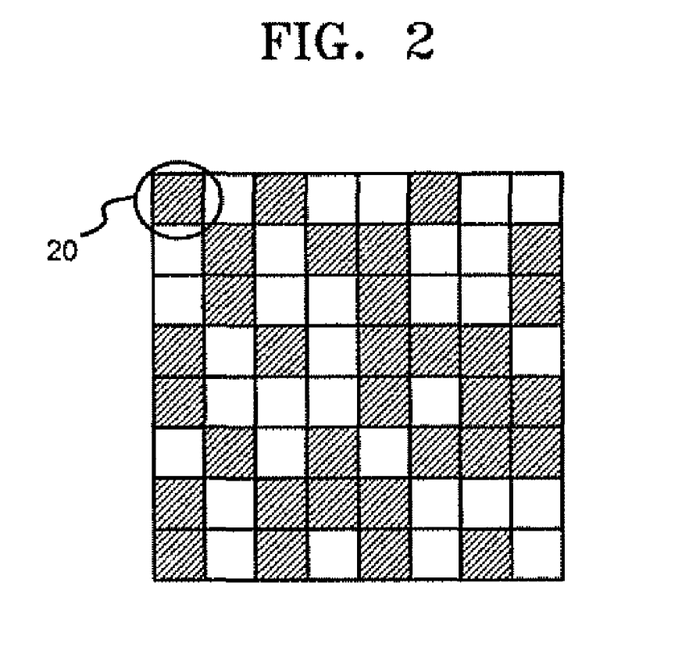
FIG. 2 is a view illustrating a spatial light modulator (SLM) where one pixel is used as an information unit for recording information.
Figure 3:
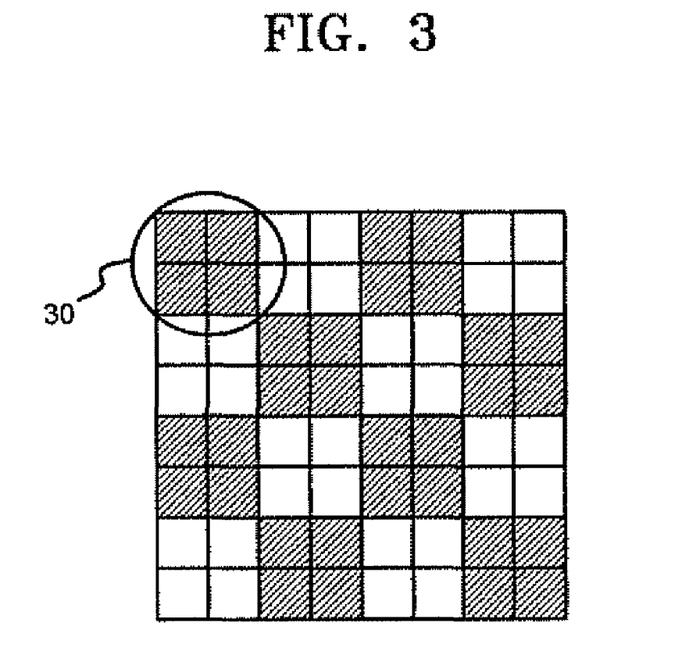
FIG. 3 is a view illustrating an SLM where four pixels are used as an information unit for recording information.

FIG. 2 is a view illustrating a spatial light modulator (SLM) where one pixel is used as an information unit for recording information. FIG. 3 is a view illustrating an SLM where four pixels are used as an information unit for recording information. When the additional information is recorded in the holographic recording medium, more than one pixel of an SLM, not a single pixel of the SLM, can be used as an information unit in order to improve a reproducing reliability. That is, when user information (or general user data) is recorded in the holographic recording medium, one pixel of the SLM is used as an information unit, as illustrated in FIG. 2. In FIG. 2, hatched areas may denote "0", and non-hatched areas may denote "1". In FIG. 2, an information unit in terms of a single pixel 20 is shown.

On the other hand, when additional information (or important information) regarding the holographic recording medium is recorded in the holographic recording medium, four pixels 30 can be used as an information unit, as illustrated in FIG. 3. Thus, the reproducing reliability of the holographic recording medium can be improved. Although four pixels are illustrated as the information unit in FIG. 3, nine pixels may be used as the information unit for recording the additional information, for example. In other example embodiments, varying the number of the pixels used to record the information units are within the scope of the invention.

In example embodiments, when four or nine pixels are used as the information unit for recording information (i.e., when an oversampling ratio is large for recording data), the required minimum spot size for the recording is smaller than where one pixel is used as the information unit, as seen from Equation 1. For example, when four pixels are used as the information unit, the size of the spot is smaller by half than that of the information unit using one pixel. This is because "d" in Equation 1 is doubled when four pixels are used as the information unit so as to halve the spot size.

However, in a typical case, although the size of the spot is smaller, an interval between books for recording the additional information is the same as an interval between books for recording the user information (or general user data). This is because, since the size of an aperture is fixed to the spot size of the user information (the general user data), information of the books is mixed and crosstalk occurs when the interval between the books is decreased. Accordingly, in the typical case, although the spot size used is smaller during recording of the additional information, the interval of the books is maintained. As a result, in the typical case, a recording space in the holographic recording medium can be wasted.

To address the above problems, example embodiments of the present invention can reduce a physical region for recording additional information in a holographic recording medium (i.e. reduce an interval between books for recording the additional information in the holographic recording medium), and can increase the size of a region for recording the data (or information). In other words, an interval or intervals between books for recording the additional information in the holographic recording medium can be reduced without increasing crosstalk. In various example embodiments, crosstalk may be reduced or eliminated.

An aperture of a variable size can be embodied in various shapes and implemented in various ways. For example, an electrical method can be used to vary the size of the aperture using a liquid crystal device; and a mechanical method can be used to vary the size of the aperture using a shutter structure found typically in a camera.

Figure 4A:
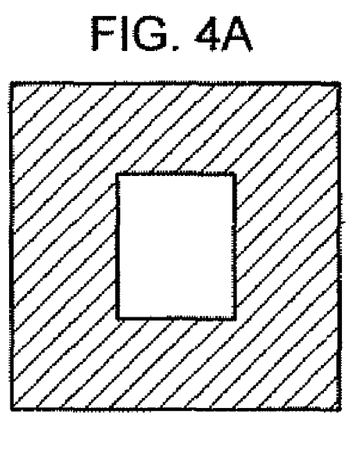
FIGS. 4A and 4B are views illustrating an aperture having a variable size, in which a liquid crystal device is used, according to an example embodiment of the present invention.
Figure 4B:
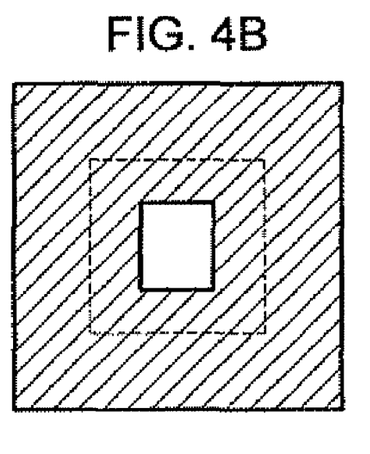

FIGS. 4A and 4B are views illustrating an aperture having a variable size, in which a liquid crystal device is used, according to an example embodiment of the present invention. When the liquid crystal device is used, the size of a light transmissive region of the liquid crystal device is increased during recording of the user information (or the general data) of the holographic recording medium, as illustrated in FIG. 4A. During recording of the additional information (or the additional data) of the holographic recording medium, the size of the light transmissive region of the liquid crystal device is reduced, as illustrated in FIG. 4B. A square dotted line is illustrated in FIG. 4B to indicate the size of the light transmissive region of the liquid crystal device during recording of the general data for comparison purposes.

Figure 5A:
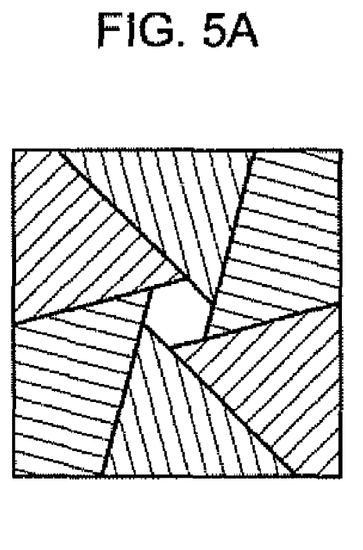
FIGS. 5A and 5B are views illustrating an aperture having a variable size, in which a mechanical shutter is used, according to an example embodiment of the present invention.
Figure 5B:
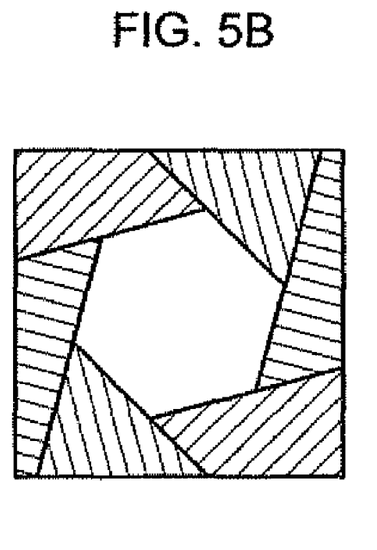

FIGS. 5A and 5B are views illustrating an aperture having a variable size, in which a mechanical shutter structure is used, according to an example embodiment of the present invention. FIG. 5A illustrates the shutter state where data regarding additional information of a holographic recording medium is recorded, and FIG. 5B illustrates the shutter state where data regarding user information (or the general information) of the holographic recording medium is recorded.

Figure 6:
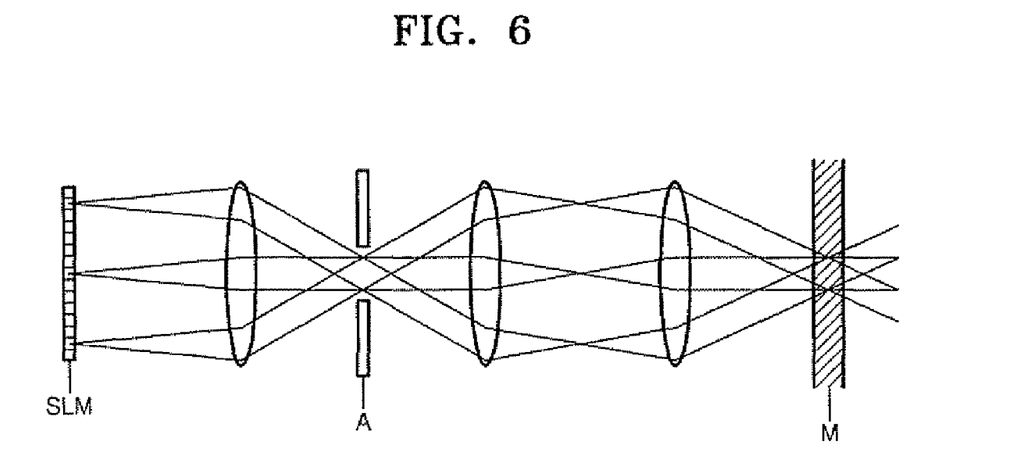
FIG. 6 is a view illustrating sizes of an aperture and an optical spot of the holographic recording/reproducing apparatus during recording of general data to a holographic recording medium, according to an example embodiment of the present invention.
Figure 7:
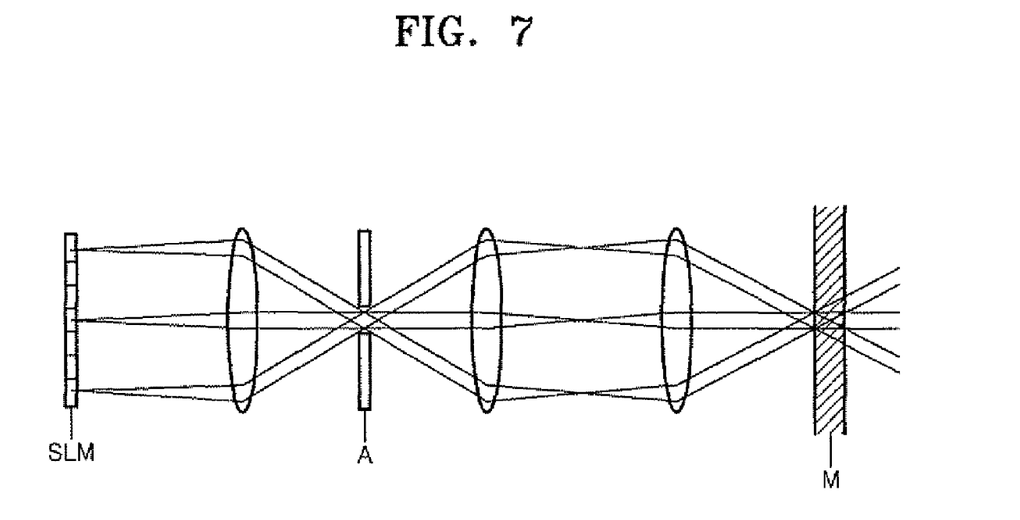
FIG. 7 is a view illustrating sizes of an aperture and an optical spot of the holographic recording/reproducing apparatus during recording of additional information to a holographic recording medium, according to an example embodiment of the present invention.

The operation of a holographic recording/reproducing apparatus having the variable size aperture will be described referring to FIGS. 6 and 7. FIG. 6 is a view illustrating sizes of an aperture A and an optical spot of the holographic recording/reproducing apparatus during recording of user information (or the general data) to a holographic recording medium M, according to an example embodiment of the present invention. In addition, FIG. 7 is a view illustrating sizes of the aperture A and an optical spot of the holographic recording/reproducing apparatus during recording of additional information to a holographic recording medium M, according to an example embodiment of the present invention. Also, FIG. 6 shows single pixels of the SLM, while FIG. 7 shows a group of pixels of the SLM. Accordingly, the difference is represented in FIG. 6 as a dense grouping of pixels, and in FIG. 7 as a thin grouping of pixels. First, during recording of the user information (or the general user data), since one pixel of an SLM is an information unit, the size of a spot formed on the holographic recording medium M via the lenses is relatively large. Accordingly, as illustrated in FIG. 6, the size of the aperture A is increased. At this time, the size of the aperture A may be 1.1 times the size of the spot according to a polytopic manner. For example, when wavelength of light is 0.405 µm, pitches of the pixels of the SLM in FIG. 6 is 13.2 µm, and a focal distance of the lenses is 18180 µm, a size of a Nyquist aperture is about 560 µm, according to Equation 1. Accordingly, the size of the aperture A can be about 616 µm, which is 1.1 times the size of the Nyquist aperture. Therefore, the user information (or the general user data) can be recorded in the holographic recording medium M at intervals of about 616 µm (i.e. the interval of the books is about 616 µm).

Second, during recording of the additional information, since four pixels of the SLM are an information unit, the size of a spot formed on the holographic recording medium M via the lenses is less than where the user information (or general user data) is recorded. In various example embodiments, the size of the spot is about half. Accordingly, during recording of the additional information on the holographic recording medium M, the size of the aperture A is reduced, as illustrated in FIG. 7. For example, when wavelength of light is 0.405 µm, pitches of pixels of the SLM is 13.2 µm, and a focal distance of lenses is 18180 µm, a size of the aperture A may be about 308 µm. Accordingly, the additional information regarding the holographic recording medium M can be recorded in the holographic recording medium M at intervals of about 308 µm (i.e. the interval of the books is about 308 µm).

According to example embodiments of the present invention, by adjusting the size of an aperture, a region (an area, or an interval), or sizes thereof for recording additional information can be reduced on a holographic recording medium M, and a data region (an area, or an interval), or sizes thereof for recording user information can be further increased on the holographic recording medium M. Currently, about 10% of the data region is used for recording the additional information. When four pixels of an SLM is an information unit, the region for recording the additional information can be reduced by 5%. Accordingly, the quantity of user information (or the general data) recorded on the holographic recording medium can be further increased by about 5%. In example embodiments, the reduction in the data region for the additional information and the increase in the region for the user information correspond, and have an inverse relationship.

According to example embodiments of the present invention, the aperture having variable size is used to block holograms from neighboring books of the holographic recording medium from propagating through a lens (or an optical system). By blocking propagation of holograms from neighboring books, the aperture having variable size allows propagation of holograms from desired books while taking account of the size or interval of the desired books recorded on the holographic recording medium. The aperture having variable size allows a decrease or elimination of crosstalk from the neighboring books.

The holographic recording/reproducing apparatus of the present invention includes an optical system that divides light emitted from a light source into a reference beam and a signal beam to provide the reference beam and the signal beam to a same location of a holographic recording medium, similar to the typical apparatus illustrated in FIGS. 1A and 1B.

Figure 8:
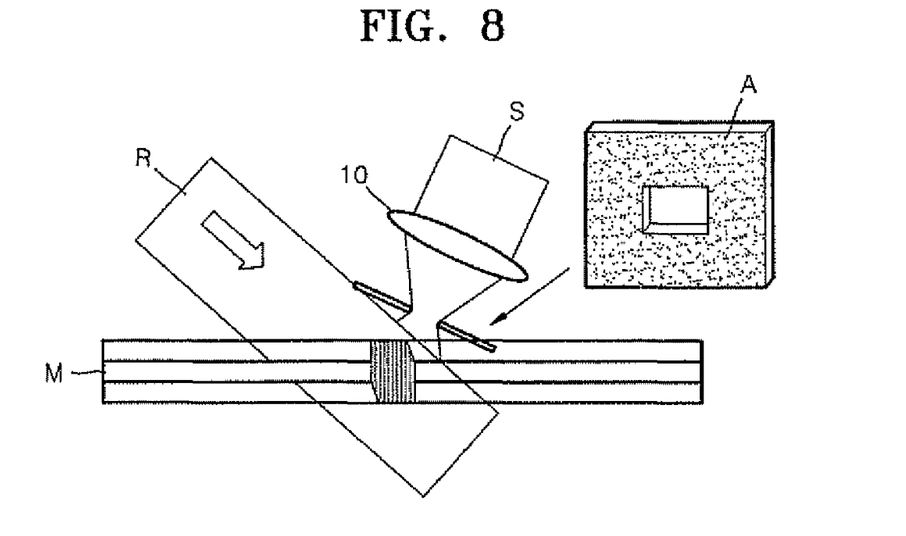
FIGS. 8 and 9 are views illustrating changed locations of an aperture, according to example embodiments of the present invention.
Figure 9:
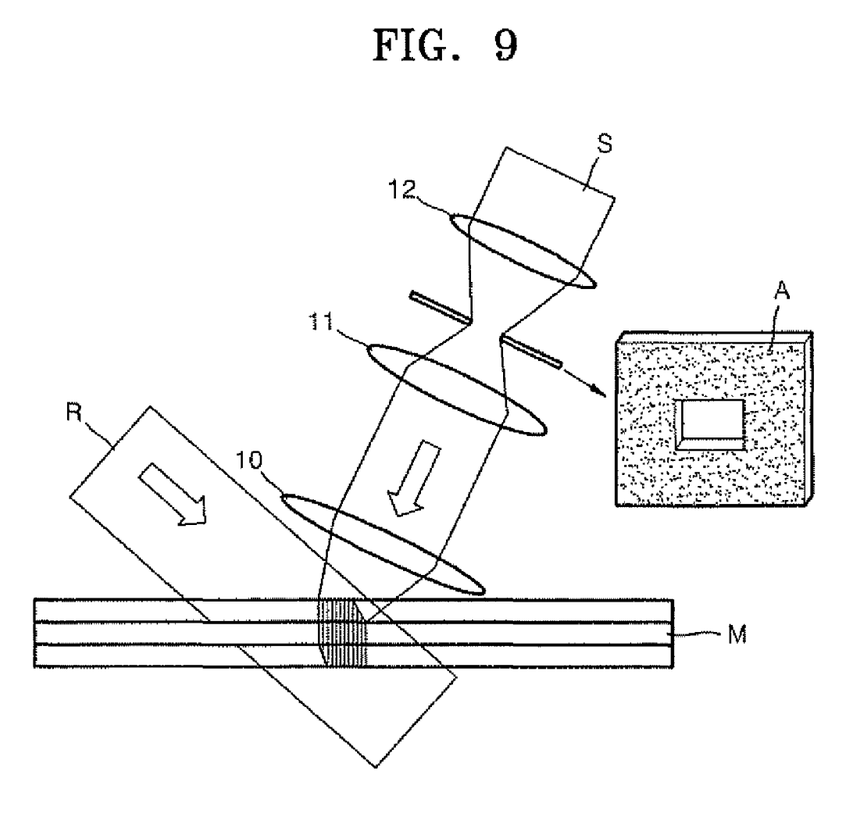

In other example embodiment of the present invention, an aperture having a variable size may be disposed on different locations depending on structures of an optical system used in the holographic recording/reproducing apparatus. FIGS. 8 and 9 are views illustrating changed locations of an aperture, according to example embodiments of the present invention.

Specifically, FIG. 8 is a view illustrating a signal beam S that is directly provided to a holographic recording medium M through an objective lens 10 without additional relay lenses. Referring to FIG. 8, a reference beam R is provided on the holographic recording medium M by an additional optical system (not shown). When the optical system for providing the signal beam S includes only an objective lens 10, an aperture A may be disposed between the holographic recording medium M and the objective lens 10. In particular, the aperture A is disposed on a location of a focal point of the objective lens 10.

FIG. 9 is a view illustrating a signal beam S that is provided to a holographic recording medium M through a plurality of relay lenses 11 and 12 and an objective lens 10. Referring to FIG. 9, a reference beam R is provided on the holographic recording medium M by an additional optical system (not shown). As illustrated in FIG. 9, when the optical system for providing the signal beam S includes the plurality of relay lenses 11 and 12 and an objective lens 10, the aperture A may be disposed between the relay lenses 11 and 12. In particular, the aperture A may be disposed on a location of a focal point between the relay lenses 11 and 12, at which location the width of the signal beams is at a minimum.

As described above, when additional information (or the main information) such as addressing information or specific information is recorded in a holographic recording medium, an oversampling ratio can be increased to record the main information in order to improve reproducing reliability thereof. At this time, the size of a spot is reduced in proportion to the oversampling ratio. According to example embodiments of the present invention, by using a polytopic aperture having a size that is variable according to the size of a spot, a physical recording region for recording the additional information on a holographic recording medium can be reduced. Accordingly, by using the holographic recording/reproducing apparatus according to example embodiments of the present invention, regions for recording information (or data) can be further increased.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the number of the pixels of the SLM used to record the information units may vary, and may be other than four or nine pixels. Accordingly, it is intended, therefore, that the present invention not be limited to the various example embodiments disclosed, but that the present invention includes all embodiments failing within the scope of the appended claims.

What is claimed is:

1. A holographic recording/reproducing apparatus comprising:
 a light source;
 an optical system to divide light emitted from the light source into a recording reference beam and a recording signal beam, and direct the recording reference beam and the recording signal beam to a same location of a holographic recording medium;
 a spatial light modulator (SLM) to modulate the recording signal beam into a two-dimensional signal pattern;
 a two-dimensional photodetector to detect a reproducing signal beam that is refracted via the holographic recording medium; and
 an aperture device comprising an aperture to limit a size of a spot of the reproducing signal beam,
 wherein a size of the aperture is variable according to an oversampling ratio of data to be recorded or to be reproduced.

2. The apparatus of claim 1, wherein the aperture device comprises a liquid crystal.

3. The apparatus of claim 1, wherein the aperture device comprises a shutter.

4. The apparatus of claim 1, wherein the size of the aperture varies according to a size of a spot of the reproducing signal beam that is Fourier-transformed by the optical system.

5. The apparatus of claim 2, wherein the size of the aperture varies according to a size of a spot of the reproducing signal beam that is Fourier-transformed by the optical system.

6. The apparatus of claim 3, wherein the size of the aperture varies according to a size of a spot of the reproducing signal beam that is Fourier-transformed by the optical system.

7. The apparatus of claim 1, wherein the optical system comprises an objective lens to direct the recording signal beam to the holographic recording medium, and the aperture device is disposed between the objective lens and the holographic recording medium.

8. The apparatus of claim 2, wherein the optical system comprises an objective lens to direct the recording signal beam to the holographic recording medium, and the aperture device is disposed between the objective lens and the holographic recording medium.

9. The apparatus of claim 3, wherein the optical system comprises an objective lens to direct the recording signal beam to the holographic recording medium, and the aperture device is disposed between the objective lens and the holographic recording medium.

10. The apparatus of claim 7, wherein the aperture device is disposed at a focal point of the objective lens.

11. The apparatus of claim 1, wherein the optical system comprises a plurality of relay lenses and an objective that cooperate to direct the recording signal beam to the holographic recording medium, and the aperture device is disposed between the relay lenses.

12. The apparatus of claim 2, wherein the optical system comprises a plurality of relay lenses and an objective that cooperate to direct the recording signal beam to the holographic recording medium, and the aperture device is disposed between the relay lenses.

13. The apparatus of claim 3, wherein the optical system comprises a plurality of relay lenses and an objective that cooperate to direct the recording signal beam to the holographic recording medium, and the aperture device is disposed between the relay lenses.

14. The apparatus of claim 11, wherein the aperture device is disposed at a focal point between the relay lenses.

15. A holographic recording/reproducing apparatus comprising:
   a light source to emit a light beam with a predetermined wavelength;
   an optical device to split the light beam into a recording signal beam and a recording reference beam, and to form an interference pattern on a holographic recording medium by converging the recording signal beam and the recording reference beam at a spot for holographic recording; and
   an aperture device positioned between the optical device and the holographic recording medium, and comprising an aperture having a size that is variable according to an oversampling ratio of data to be recorded or to be reproduced.

16. The apparatus of claim 15, wherein the aperture is a polytopic aperture.

17. The apparatus of claim 15, further comprising a spatial light modulator (SLM) comprising a plurality of pixels that are selectable to modulate the recording signal beam into a two-dimensional signal pattern.

18. The apparatus of claim 15, wherein each one of the pixels is a recording unit for recording user information.

19. The apparatus of claim 15, wherein more than one of the pixels are collectively a recording unit for recording other information.

20. The apparatus of claim 15, wherein a size of the aperture used to record user information is larger than a size of the aperture used to record other information.

21. The apparatus of claim 20, wherein the size of the aperture used to record other information increases an interval between books recorded on the holographic recording medium and decreases crosstalk of the books.

22. The apparatus of claim 15, wherein the optical device comprises one or more lenses, and the aperture device is positioned at a focal point of the one or more lenses.

23. The apparatus of claim 1, wherein when a wavelength of light is 0.405 μm, pitches of pixels of the SLM is 13.2 μm, and a focal distance of lenses is 18180 μm, a size of a Nyquist aperture is about 560 μm and the size of the aperture is about 616 μm, which is 1.1 times the size of the Nyquist aperture.

24. The apparatus of claim 1, wherein when a wavelength of light is 0.405 μm, pitches of pixels of the SLM is 13.2 μm, and a focal distance of lenses is 18180 μm, a size of the aperture is about 308 μm.

* * * * *